United States Patent Office 3,356,570
Patented Dec. 5, 1967

3,356,570
COMPOSITION FOR TREATING SHOCK
Harvey R. Butcher, Jr., St. Louis, Mo., assignor to The Trustees of Barnes Hospital, St. Louis, Mo., a trusteeship of Missouri
No Drawing. Filed Nov. 27, 1964, Ser. No. 414,420
5 Claims. (Cl. 167—58)

The present invention relates to a composition for treating shock in animals, including human beings, as well as lower animals, and in its specific and preferred embodiment it consists of a lactated Ringer's solution having a pH of about 7.4 to 9.1, which pH is obtained normally by the addition of sodium hydroxide. The optimum pH is about 8.2.

Heretofore, shock has been treated by giving intravenously some solution such as Ringer's solution or lactated Ringer's solution. Such solutions normally have a pH on the acid side. One commercial Ringer's solution has a pH of about 6.5.

A conventional Ringer's solution is an isotonic solution having approximately the following composition: 0.7% NaCl; 0.3% KCl; 0.025% $CaCl_2$; and water. A lactated Ringer's solution includes sodium lactate as well as NaCl so that, for example, 130 milli-equivalents of sodium ions exist per liter of solution.

To embody the present invention, an alkaline Ringer's solution is made by adding a sufficient amount of sodium hydroxide to raise the pH to the range of 7.4 to 9.1 and preferably about 8.2

An alkaline lactated Ringer's solution suitable for this invention can be prepared as shown in the following example:

EXAMPLE (1) Name: *Concentrated ringers*

Formulation:

| | |
|---|---|
| Sodium chloride (C:P:)_____gm__ | 75 |
| Potassium chloride (A:R:)_____gm__ | 50 |
| Magnesium chloride (A:R:)_____gm__ | 25 |
| Calcium chloride·$2H_2O$ (dihydrate)_____gm__ | 25 |
| Freshly distilled water q.s. _____cc__ | 5000 |

Procedure:

Weigh out above ingredients into flask
Add 3000 cc. water
Shake until dissolved
Add water q.s. 5000 cc.

(2) Name: *Molar sodium lactate*

Formulation:

| | |
|---|---|
| 85% lactic acid_____cc__ | 400 |
| Sodium hydroxide pellets_____gm__ | 195 |
| Phenol red indicator_____mg__ | [1] 4 |
| Freshly distilled water q.s. _____cc__ | 4000 |

[1] pH range 6.8–8.4.

Procedure:

Measure 400 cc. 85% lactic acid into wide mouth Pyrex flask. Add 1000 cc. distilled water and phenol red indicator (4 mg.). Weigh NaOH pellets, placing container in cold water to prevent container from over-heating. Mix with above solution. Bring volume to 4000 cc. with distilled water. Boil for 30 minutes.[a] Cool solution, q.s. again to 4000 cc. Filter. Pour into bottles which have been previously washed and treated.

(3) Name: *Alkaline lactate ringers*

Formulation:

| | Cc. |
|---|---|
| Concentrated ringers_____ | 240 |
| Molar sodium lactate_____ | 150 |
| Freshly distilled water q.s. _____ | 6000 |

Procedure:

Refer to master formula for preparation of parenteral solutions.

Mix above concentrated solutions 1 and 2 and filter through mandler candle. Filtered solution normally comes through acidic (yellow). Add one drop of 5% NaOH solution which will change solution to alkaline side (salmon pink). Refilter solution. If solution retains the proper color it is then packaged and autoclaved. If solution again comes through acidic [b] (yellow) then one more drop of 5% NaOH solution is added and solution is then again refiltered.

The alkaline lactated Ringer's solution of this invention can be used by being administered intravenously in cases of shock, especially hemorrhagic shock, preferably it appears, with some compatible blood. As the following table of experimental results indicates, the use of alkalized lactated Ringer's solution is as efficacious as the restoration to the animal of its shed blood, and a mixture of the two is best.

[a] Color may change from red to yellow; if this occurs, keep boiling. Add strong solution 50% NaOH drop by drop until color changes to *salmon pink* and remains constant on boiling. If too much NaOH is added, solution remains pink all during boiling period. Add lactic acid 85% drop by drop until yellow color appears. Then start adding NaOH to bring salmon pink color back.
[b] This rarely happens.

THE RESULTS OF TREATING CONTROLLED CANINE HEMORRHAGIC SHOCK

[Modified Wigger's preparation]

| Method of Treatment | No. treated | No. dying | No. surv. | Prop. surv. |
|---|---|---|---|---|
| (1) Shed blood only_____ | 24 | 12 | 12 | .50 |
| (2) Shed blood plus lactated Ringer's solution [1] (pH 8.5) _____ | 9 | 3 | 6 | .67 |
| (3) Lacated Ringer's solution alone: [2] | | | | |
| (pH 8.5)_____ | 20 | 10 | 10 | .50 |
| (pH 6.5)_____ | 7 | 6 | 1 | .14 |
| (4) Lactated Ringer's solution [2] plus ½ shed blood (pH 8.5)_____ | 8 | 1 | 7 | .87 |
| (5) Shed blood plus 5% glucose in $H_2O$ [3]_____ | 7 | 6 | 1 | .14 |

[1] Volume lactated Ringer's solution equaled volume of shed blood.
[2] Volume of lactated Ringer's solution equaled the plasma plus four times the red blood cell volume removed.
[3] Volume 5% glucose in water equaled three times the volume of shed blood.

The use of the present invention on human beings is shown by the following table of results from treating burns of 20–85% of human body surface with alkaline Ringer's solution alone:

| Patient | Age | Percent Body Surface Burned | Liters Alkaline Lactated Ringer's Used First 24 Hrs. Past Burn | Recovery From Shock | Renal Insufficiency |
|---|---|---|---|---|---|
| L.S. | 18 | 85 | 18.0 | Yes | None |
| S.H. | 10 | 65 | 6.7 | Yes | None |
| W.G. | 24 | 30 | 13.2 | Yes | None |
| D.W. | 25 | 70 | ¹ 10.4 | Yes | None |
| W.H. | ² 4 | 60 | 2.9 | Yes | None |
| C.S. | 24 | 75 | 13.2 | Yes | None |
| L.T. | 64 | 40 | 9.0 | Yes | None |
| D.S. | 57 | 80 | 13.3 | Yes | None |
| L.B. | 6 | 65 | 3.3 | Yes | None |

¹ This patient also received 500 ml. compatible blood. None of the other patients received blood or other colloid solutions as therapy for shock.
² Days.

No plasma, Dextran, or other colloid solutions are necessary to treat burn shock successfully in man, if the alkaline lactated Ringer's solution is used in sufficient quantities. It may be noted that the quantities used in both tables is much greater than the quantities of conventional Ringer's solution heretofore used.

The patients are also treated with appropriate bacterial control agents to reduce infection. But the shock requires no treatment other than the alkaline Ringer's solution. No solute or other diuretics (i.e., Manitol, Inulin) are required.

It is not known with assurance what is the reason for the improvement in effectiveness of the material with the higher pH. It has been shown that the sodium content of certain commercial Ringer's solutions may run about 130 or 131 milliequivalents per liter, whereas with the composition of the present invention, the sodium content may run from about 137 to as high as 146 milli-equivalents per liter.

Analysis of different products of alkalized lactated Ringer's solution made by the procedure given above in comparison with a commercial product is as follows:

| L.R. | MEq/L Na | MEq/L K | MEq/L Ca | pH |
|---|---|---|---|---|
| 1 | 146 | 6.1 | 3.3 | 7.85 |
| 2 | 145 | 6.0 | 3.2 | 8.7 |
| 3 | 137 | 5.6 | 2.9 | 8.4 |
| 4 | 140 | 5.7 | 3.3 | 8.45 |
| 5 | 140 | 5.8 | 3.3 | 8.2 |
| 6 | 137 | 5.45 | 2.9 | 8.0 |
| 7 | 137 | 5.4 | 3.1 | 8.0 |
| 8 | 140 | 5.75 | 3.3 | 7.4 |
| Commercial | 131 | 4.0 | 2.7 | 6.0 |

While the specific physiological effect of the present composition is not known with assurance, it is thought that the presence of the alkaline material tends to reduce the acidotic condition which accompanies shock, such as the shock produced by burns, blood loss, and the like. It is also thought that the available sodium supplied intravenously in the foregoing manner tends to improve restoration of the functional deficit of sodium in the extracellular spaces in the body that certain research has shown to exist after a condition of hemorrhagic and other forms of shock have developed. Thus the alkalized Ringer's solution, preferably lactated, not only counteracts acidotic conditions, but also is effective in its action against extracellular sodium deficiency, whatever its cause—whether it be hemorrhage, diarrhea, burns, crushed tissues or other injury.

It is, therefore, intended to lay especial emphasis upon the prevention of acidosis in animals in state of shock at the time the blood restorative is administered, and especially to do so by addition of an alkalized solution consisting mainly of sodium salts. Finally, it is particularly emphasized that the best results occur when the material used as the restorative consists of a Ringer's solution, especially a lactated Ringer's solution, with a pH of about 7.4 to about 9.1 produced therein by sodium hydroxide. The optimum pH is about 8.2.

Various changes and modifications may be made within the process of this invention as will be readily apparent to those skilled in the art. Such changes and modifications are within the scope and teaching of this invention as defined by the claims appended hereto.

What is claimed is:

1. A composition for use in treating shock in animals: consisting essentially of a lactated Ringer's solution combined with sodium hydroxide in a quantity sufficient to raise the pH to from 7.4 to about 9.1, and to provide a sodium content of about 137 to at least about 146 milliequivalents per liter.

2. A composition for use in treating shock in animals: consisting essentially of a Ringer's solution with a pH of about 7.4 to about 9.1 mixed with compatible blood, the volume of Ringer's solution being at least about as great as the volume of blood.

3. A composition for use in treating shock in animals: consisting essentially of a Ringer's solution and sodium hydroxide, the latter in quantity to raise the pH to from about 7.4 to about 9.1, and to provide a sodium content of about 137 to at least about 146 milliequivalents per liter.

4. The composition of claim 1 whereis the pH is raised to about 8.2.

5. The composition of claim 3 wherein the pH is raised to about 8.2.

References Cited

Rosenthal, S.: "Wound Shock," Scientific American (December 1958), pp. 115–124.

Davis, J. H.: "Burns," "Current Therapy 1960," Saunders (1960), pp. 675–6.

Martin, E. W., et al.: "Remington's Practice of Pharmacy," Mack (1961), pp. 782–3.

ALBERT T. MEYERS, *Primary Examiner.*

SAM ROSEN, *Examiner.*

S. J. SINGER, V. C. CLARKE, *Assistant Examiners.*